April 7, 1970  J. G. CALLAN  3,504,835

WEB REGISTRY CONTROL APPARATUS

Filed Dec. 29, 1967  4 Sheets-Sheet 2

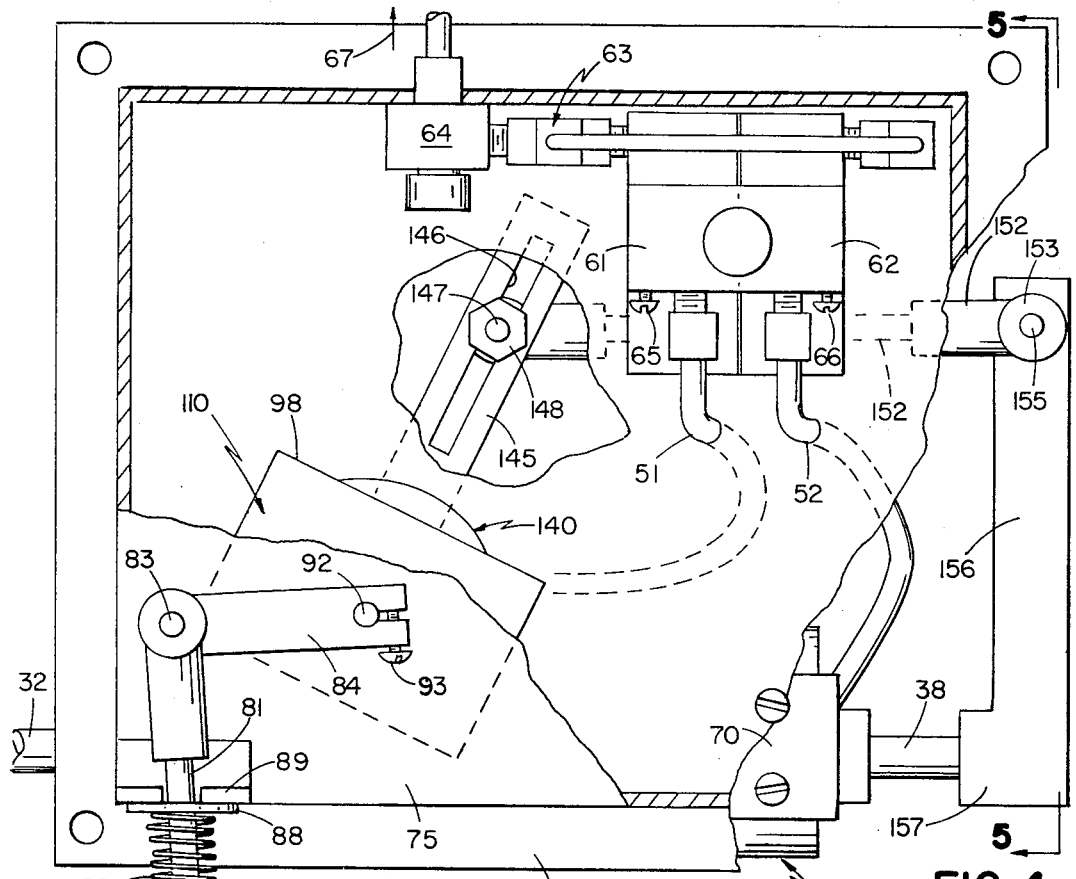
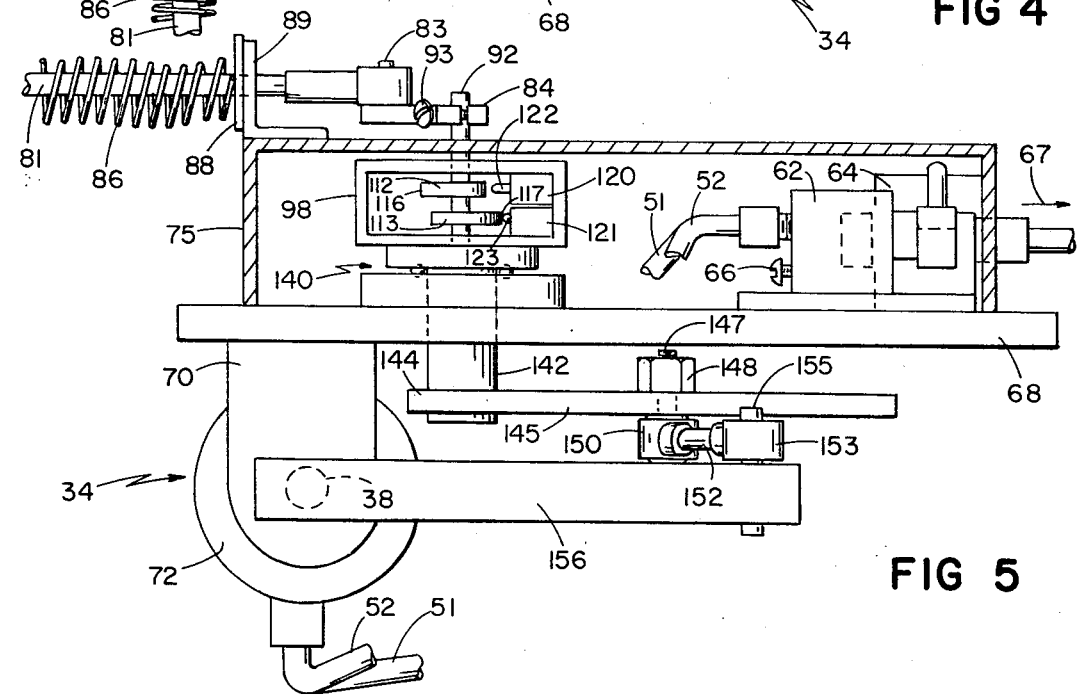

United States Patent Office 3,504,835
Patented Apr. 7, 1970

3,504,835
WEB REGISTRY CONTROL APPARATUS
John Gurney Callan, Sharon, Mass., assignor to Knox, Inc., South Walpole, Mass., a corporation of Massachusetts
Filed Dec. 29, 1967, Ser. No. 694,713
Int. Cl. B65h 25/06
U.S. Cl. 226—23                                         2 Claims

ABSTRACT OF THE DISCLOSURE

Apparatus is provided for detecting movements of a moving web out of registry with requipment operating thereon and for actuating adjustment mechanism to restore registry. The detector is designed to produce opposite actuation of the adjustment mechanism according to movements of the detector control (web or element movable therewith) from registry with a nul zone of the detector to registry with operating zones thereof at either side of the nul zone. The detector is movably mounted and is moved by feedback mechanism in proportion to adjustment actuation in the direction to restore registry of the nul zone with the control when a movement of the control away from such registry terminates. The feedback enables adjustment proportional to web movement with simple on-off type controls.

---

This invention concerns apparatus for controlling registry of a moving web with equipment such as feed rolls operating on the web. More particularly the invention concerns apparatus for detecting a lack of desired registry and for producing the requisite correctional action of adjustment equipment.

Appratus of the type concerned includes a detector for sensing departures of a portion of the web such as its edge from a desired position and for causing appropriate correctional action by adjustment equipment. The departure sensed may be lateral as where longitudinal alignment is being controlled in which case the adjustment equipment is usually one or more rolls engaging the web which are moved to produce the corrective action. The departure sensed may also be from a desired plane as where feed tension is being controlled, in which case the adjustment may be made in the operating speed of feed or take-up rolls.

Various types of sensors are used depending on the nature of the web and other conditions, such as photocells or other light change detectors, pressure change detectors or mechanical feelers. The control which they exercise may be of the on-off type which calls for corrective adjustment upon departure of the fabric from a given position until it returns to that position. Such control has the advantage of simplicity but has the disadvantage of the likelihood of overcorrection. More sophisticated controls govern the extent of adjustment to make it proportional to the extent of wander of the web. Such controls have involved elaborate systems, usually electronic, for measuring the amount of web wander from a desired normal position in accordance with increase or decreases in light intensity or in pressure or in extent of movement of a mechanical feeler and for translating such detected changes into proportionate operation of the adjustment mechanism in the proper direction. The systems have been dependent upon and useful only with a particular type of sensor for which the system is designed.

The object of this invention is to provide apparatus of the type concerned of the proportional adjustment type which is simpler, less expensive and more reliable than prior systems and in which various types of detectors can be utilized.

Although in my apparatus the adjustment is proportional to the amount of web wander it utilizes simple detection and adjustment controls of the on-off type, that is, controls which call for continued operation of the adjustment mechanism so long as the web portion being detected remains outside a preselected zone of the detector. This zone may for example be the midpoint or a central portion of a photocell detector beam or of an air inlet to a pressure detector system or of a position detector of a mechanical feeler. In order to make the adjustment by such a system nevertheless proportional to web wander, my apparatus provides position adjustability of this detection zone which is controlled by feedback of the extent of operation of the web adjustment mechanism, so that actually or in effect the zone tracks the web area being detected. In this way, web position correction adjustment continues proportionally so long as the web continues to wander in a given direction. When wander in that direction ceases, operation of the web adjustment mechanism terminates because the nul area of the detector zone has caught up with the web. When the web returns sufficiently toward desired position to pass through the nul area, opposite correctional adjustment commences thereby reducing the corrective action that has been made on the web adjusting mechanism until the web and the web adjustment mechanism return to normal position.

The feedback may be mechanically, electrically or pneumatically controlled. If a mechanical feeler is utilized which automatically follows the web, the feedback is connected to a movable detector element having a detector zone as above described which is operative or nul according to the position of the feeler with reference to it. As the feeler moves out of nul position to one of its opposite web adjustment operating positions, the feedback returns the movable detector element toward its nul position with reference to the feeler which is reached when the feeler stops moving in the given direction. Where interference with light or air flow is the means of detection, the sensing head is movably mounted and controlled by the feedback to track the web area with which it cooperates. The on-off type operating connections for the web adjustment mechanism, which is all that my system requires, may be quite simple such as two electric circuits connected for opposite actuation of the web adjustment controlling mechanism, each circuit having a normally open switch which is closed when the detector element and the control which it senses (feeler part or web) move relatively to each other from the nul to the corresponding actuating position of the detector element.

The embodiment primarily selected for illustrating the invention utilizes a detector of the mechanical feeler type which is generally preferred for those applications of the invention, such for example as belt guidance, in which the web is sufficiently thick and strong to permit automatic tracking by such a detector. In the accompanying drawings:

FIGURE 4 is a top view, partially in section, of the web-guiding assembly shown in FIG. 1;

FIGURE 5 is a rear view, in the direction indicated by line 5—5 of FIG. 4, of the web-guiding assembly.

Figure 1:
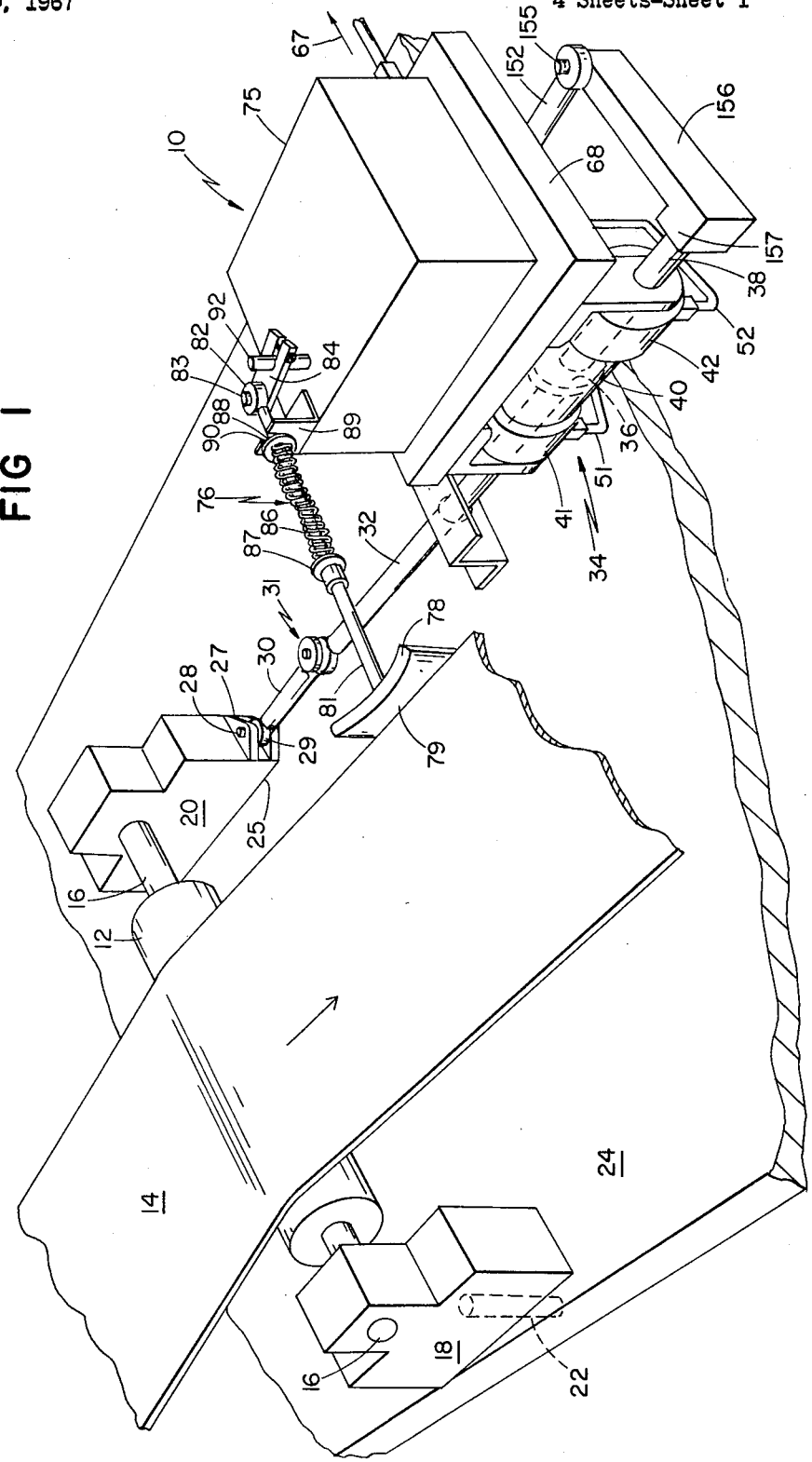
FIGURE 1 is a perspective view, partially in section, of a web, roller assembly, and a web-guiding assembly embodying the present invention.

In FIGURE 1, there is shown a web-guiding assembly 10 for pivoting roller 12 to control the lateral movement of web 14, moving in the direction indicated by the arrow. Roller 12 is mounted on roller shaft 16 which is mounted at one end in pivot block 18 and at the other end in sliding block 20. Roller 12 is transversely pivoted about pin 22 which is rotatably journalled into pivot block 18 and secured to support 24, in response to the movement of sliding block 20 on bearing surface 25 generally parallel to the direction of web 14, although slightly arcuate.

Connector 27 is mounted on block 20 and secures pin 28, which is rotatably received through spherical rod end 29. Link 30 is secured, through pivot joint 31 to first piston rod 32 of piston assembly 34 which is secured to piston head 36 and extends through the piston head to provide a coacting piston rod 38 at the opposite side of piston head 36. Rods 32 and 38 and piston head 36 are contained within actuating cylinder 40 which includes a first pressure chamber 41 and a second pressure chamber 42.

Figure 2:
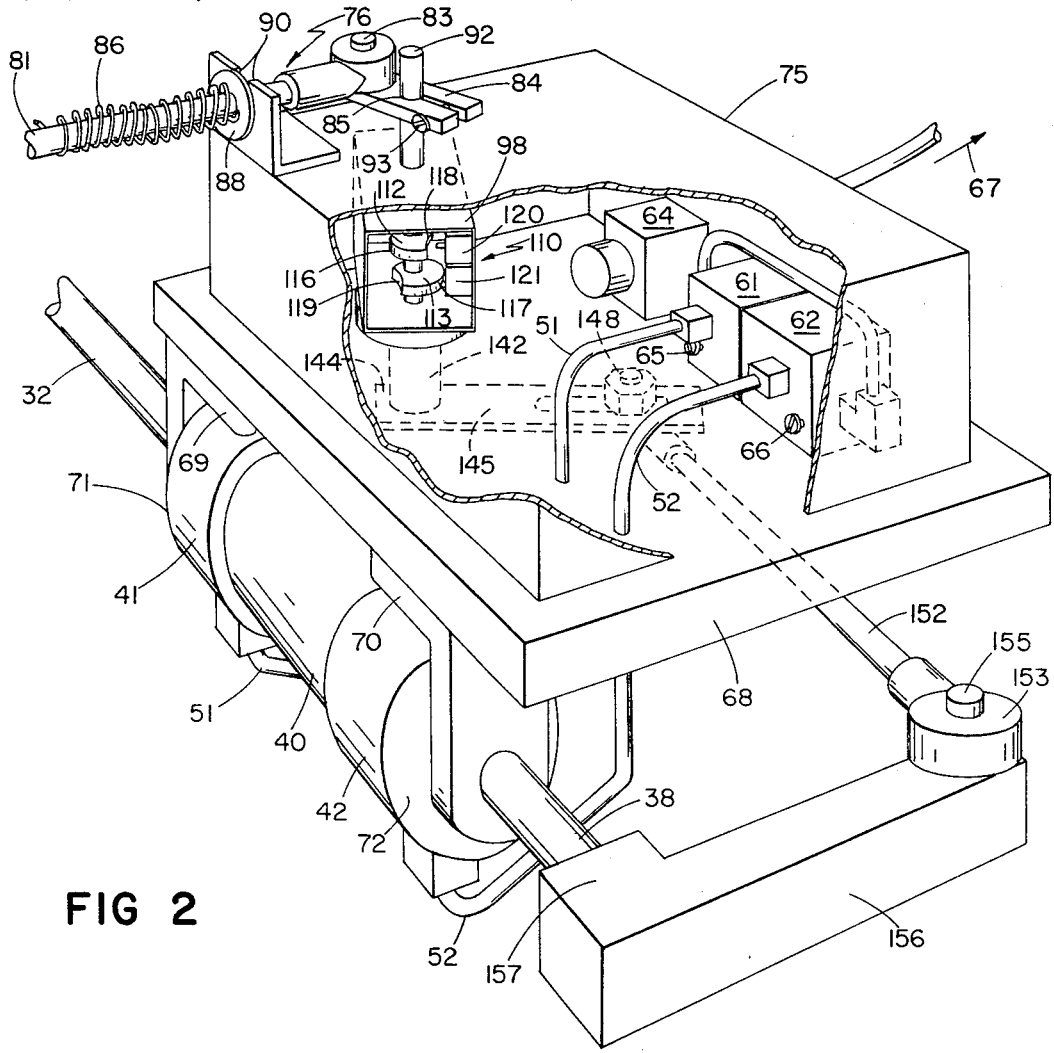
FIGURE 2 is a perspective view, similar to FIGURE 1, of the web-guiding assembly, with the housing partially broken away.

Referring now to FIGURES 1 and 2, a first air conduit 51 communicates with first pressure chamber 41 and a second air conduit 52 communicates with second pressure chamber 42. Conduit 51 extends to a first three-way solenoid valve 61 and conduit 52 extends to a second three-way solenoid valve 62. Referring also to FIGURE 4, both valves 61 and 62 are connected, through conduit 63, with pressure regulator 64 which supplies a constant air pressure to pipe 63 from an external air supply source 67 (e.g., Mill air supply). Solenoid valves 61, 62 are responsive, in a way later described, to direct air under pressure through conduit 51 to chamber 41, or through conduit 52 to chamber 42 or to open the chambers to exhaust, thus to control the movement of piston head 36 and the axial movement of the rods 32, 38 secured thereto. Each valve 61, 62 includes in its exhaust port a bleeder needle valve 65, 66, respectively, these needle valves being responsive to deenergization of solenoid valves 61 or 62, to allow air to exhaust slowly from chambers 41 or 42 when pressure is applied to the opposite chamber. The rate of exhaust may be controlled by adjusting needle valves 65, 66 and hence the rate of movement of piston head 36 controlled.

Piston assembly 34 is secured to base plate 68 by brackets 69, 70 on piston end plates 71, 72 respectively. Base plate 68 also supports housing 75 which supports sensing assembly 76.

As best shown in FIGURES 1 and 2, sensing assembly 76 includes sensing palm 78, having an arcuate sensing surface 79 for contacting web 14. Palm 78 is secured to sensor arm 81, which terminates in spherical rod end 82. Connecting pin 83 is rotatably secured in rod end 82 and is fixed to crank arm 84.

Sensor spring 86 is compressed around sensor arm 81 between washer 87 and a second washer 88 adjacent sensor arm bracket 89, which includes guide slot 90 for making sensor arm 81 axially responsive to lateral movement of web 14. Operating shaft 92 is secured in bore 85 of crank arm 84, and held in place by set screw 93 (FIGS. 4, 5) so that shaft 92 will turn with transverse movement of crank arm 84. Operating shaft 92 extends into housing 98 which surrounds the remainder of switching assembly 110.

As seen in FIGURES 2 and 5, switching assembly 110 includes operating shaft 92, upon which are secured two disc-like cams, 112 and 113. Each cam 112, 113 has a generally cylindrical camming surface 116, 117, and a noncamming arcuate portion 118, 119, respectively, of smaller diameter than the respective camming surface. Microswitches 120, 121 are mounted on housing 98 and positioned such that when camming surface 116 is in contact with lever 122, microswitch 120 is ON; and, when camming surface 117 is in contact with lever 123, microswitch 121 is ON. Cams 112, 113 are independently rotatably adjustable on operating shaft 92 to any fixed position relative to one another to regulate the nul zone, i.e., the amount of rotation of shaft 92 which is possible without tripping either of microswitches 140, 141. This nul zone is also controlled by the size of arcuate portions 118, 119. If desired each cam 112 may consist of two identical cam elements (like 112) rotatable relative to one another to control the effective size of the noncamming portion.

Figure 3:
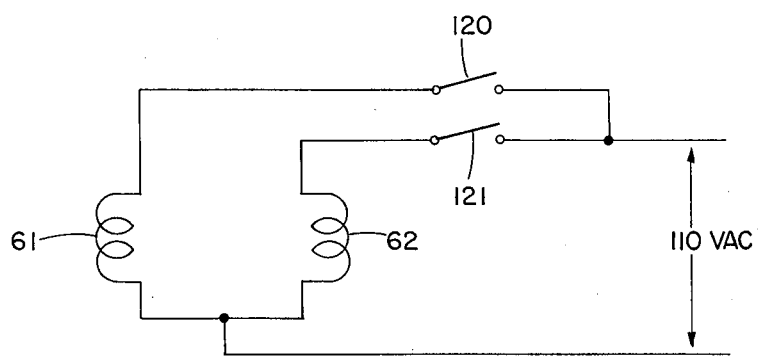
FIGURE 3 is a diagram of the electric circuits of the web-guiding assembly shown in FIG. 1.

According to the circuit diagram of FIGURE 3, when switch 120 is closed (the "ON" position) solenoid 61 will be actuated to direct air through conduit 51 into pressure chamber 41 of piston assembly 34. Solenoid 62 being deenergized allows the air from chamber 42 to exhaust through conduit 52 and needle valve 66. Similarly, when switch 121 is closed (the "ON" position), solenoid 62 is activated to direct air through conduit 52 into pressure chamber 42 and solenoid 61 being deenergized permits air from chamber 41 to escape through conduit 51.

The feedback assembly is most clearly shown in FIGURES 3–5. Switch housing 98 is supported on base plate 68 through a rotating base 140. Base pin 142 is secured to the housing and also secured in rod end 144 and extends rotatably through base plate 68. Lever arm 145 includes ratio lever slot 146 through which extends threaded ratio pin 147, which is secured, where desired, along ratio lever slot 146 by locking nut 148. Ratio pin 147 also rotatably extends through spherical rod end 150 on feedback linkage arm 152. Arm 152 terminates in spherical rod end 153 into which rotatably extends feedback linking pin 155, which is secured to feedback bar 156. Piston rod 38 is secured to block 157 on feedback bar 156.

In operation, a lateral movement of web 14 causes a corresponding longitudinal motion of sensor arm 81, which causes crank arm 84 to pivot about pin 83, and thus cause rotation of operating shaft 92. Assuming the lateral movement of web 14 is toward web guiding assembly 10, sensor arm 81 will move back toward web-guiding assembly 10, compressing spring 86 and causing, through crank arm 84, a clockwise rotation of shaft 92. This clockwise rotation will cause camming surface 116 to bear against and close microswitch 120, assuming the movement of web 14 is large enough to move noncamming surface 118 past microswitch 120. In normal operation, cams 112, 113 would be placed, e.g., so that portions 118, 119 both are adjacent microswitches 120, 121 (i.e., both microswitches OFF) when roller shaft 16 is perpendicular to the edge of web 14.

When switch 120 is ON, solenoid 61 will be actuated to direct compressed air through conduit 51 into pressure chamber 41. This will cause piston head 36 and piston rod 32 to travel away from block 20, thus moving block 20 in the same direction as the direction of travel of web 14, the arcuate characteristic of the travel of block 20 being compensated for, to eliminate possible strain on piston rod 32, by joints 31 and 27–29. This produces clockwise pivoting of roller shaft 16 and block 18 about pin 22 which will cause web 14 to move away from web-guiding assembly 10. At the same time, the feedback linkage operates to turn base pin 142 in a clockwise direction, thus rotating microswitches 120, 121 about operating shaft 92 and returning these switches to a position adjacent noncamming surfaces 118, 119, respectively. This feedback process is actuated by travel of piston head 36, which moves rod 38 and, hence, block 157 and feedback bar 156 away from block 20. Arm 152 will then bear against and rotate lever arm 145 in clockwise direction, which will thus cause clockwise rotation of base pin 142, housing 98 and microswitches 120, 121 about operating shaft 92.

As web 14 moves laterally away from block 20, sensor arm 81 will follow it, causing counter-clockwise rotation of shaft 92 until, this time, microswitch 121 is switched ON by camming surface 117. This actuates solenoid 62 to direct air through conduit 52 into pressure chamber 42, causing piston head 36 and attached rods 32, 38 to move toward block 20 and move it into a direction opposite the direction of travel of web 14, thus causing a counter-clockwise rotary movement of shaft 16 and block 18 about pin 22. This movement tends to realign the roller 12 perpendicular to the edge of web 14. Again, the feedback linkage will result, by travel of feedback arm 156 laterally toward block 20 in a counter-clockwise rotation of base pin 142, thus rotating microswitches 120, 121 back adjacent noncamming surfaces 118, 119 respectively, the "nul" zone.

Figure 6:
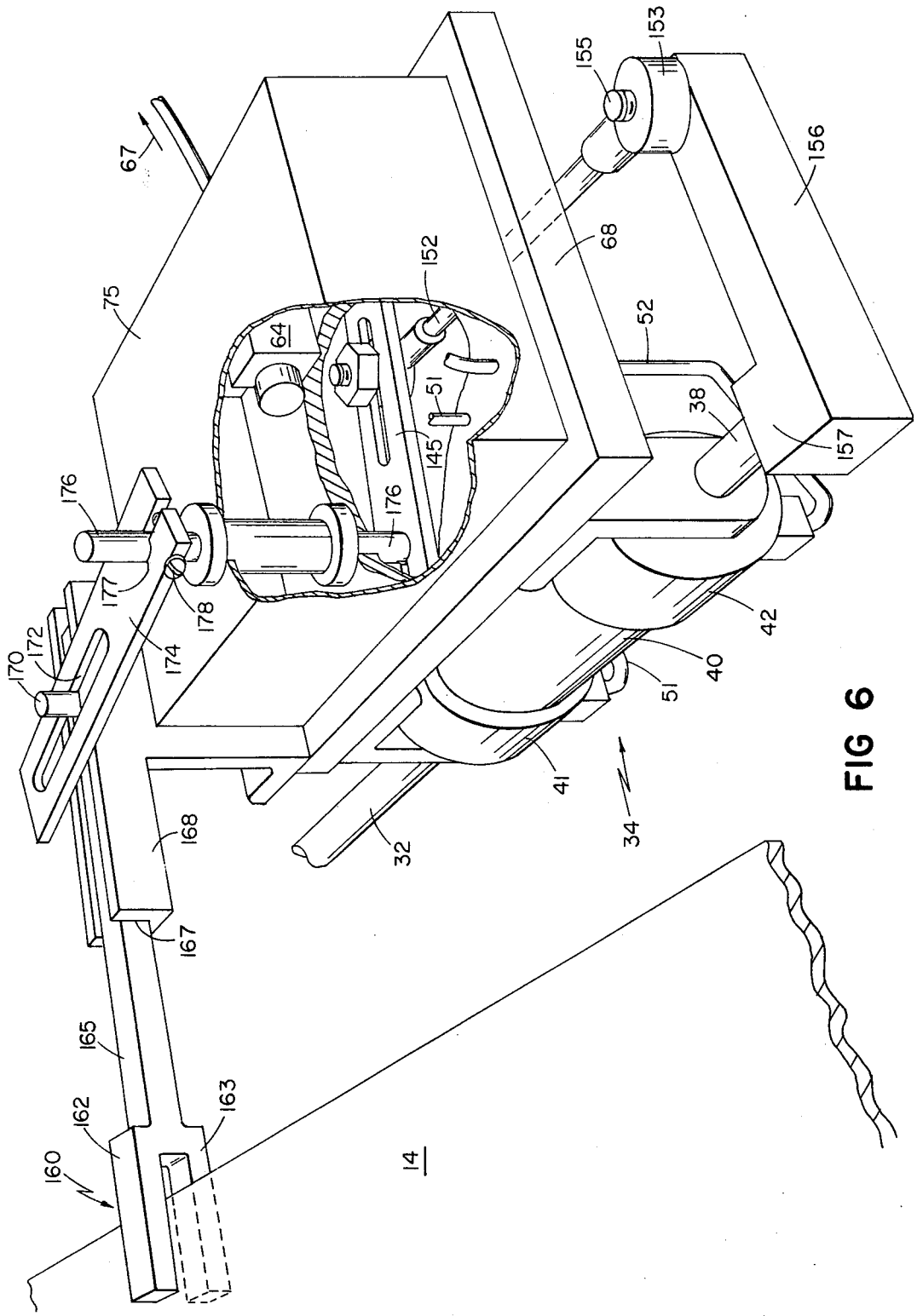
FIGURE 6 is a perspective view of another web-guiding assembly embodying the present invention.

In FIGURE 6 there is shown another embodiment of the present invention wherein mechanical feeling assembly 76 has been replaced by a direct sensing head 160. Head 160 includes an appropriate sensor (not shown) for sensing the position of the web edge as between two operating zones and an intermediate nul zone. The sensor may be a photocell or pressure change sensor of conventional type which translates light or pressure detection greater or less than that which determines the nul zone into electrical output for activating the solenoids 61, 62 respectively.

Head 160 has a pair of opposed arms 162, 163 for surrounding an edge of web 14 and locating the sensor with respect thereto. Arms 162, 163 are integral with rod 165 which extends into track 167 of rod support 168. Projecting pin 170 is axially secured to rod 165, and extends through elongated slot 172 of crank arm 174. Operating shaft 176 is secured in bore 177 of crank arm 174 by threaded set screw 178, similar to the securing of shaft 92 by set screw 93 to crank arm 84 in the embodiment of FIGS. 1–5. The remainder of the embodiment of FIGURE 6 is similar to that of FIGS. 1–5, like parts having been identically numbered.

The operation of this embodiment is similar to that of the embodiment of FIGURES 1–5. Changes in the lateral positioning of web 14 from registry with the nul zone of the sensor are detected by the sensor to cause activation of either of solenoids 61, 62. For example, lateral travel of web 14 away from sensing head 160 will activate solenoid 62, thus directing compressed air to chamber 42 and causing through the piston assembly appropriate counter-clockwise pivoting of roller shaft 16 and block 18 (FIG. 1), for moving web 14 back toward its original position. At the same time, feedback bar 156 is moved laterally away from rod 165, causing, through linking pieces 152, 145, a counter-clockwise rotation of shaft 176, and hence of crank arm 174 about a pivot point central to shaft 176. Elongated slot 172 will thus bear against pin 170, and cause pin 170 to slide in slot 172 toward shaft 176, this combined motion serving to pull rod 165 back from web 14, and in thus following web 14, realign the nul zone of the sensor with the web, deactivating solenoid 62. Travel of web 14 in a direction toward the sensing assembly will cause a similar opposite piston, roller, and feedback movements.

I claim:
1. Apparatus for controlling the operation of a device for regulating registry of a traveling web with equipment operating thereon which comprises:
   operating means for connection to said device to produce opposite regulatory adjustments thereof;
   detector means associated with the web for detecting opposite movements thereof requiring opposite adjustment operations of said device including a mechanical feeler movable in response to movements of the web to be detected, said detector means also including a movably mounted detector element having two operating zones and an intermediate nul zone;
   means connecting said operating zones of said detector element to said operating means to produce said opposite regulatory adjustments thereof respectively when the web moves from a position of reference to said nul zone to a position of reference to a said operating zone and until return of the web to a position of reference to said nul zone as determined by movements of said feeler relative to said element;
   and feedback means connected to said detector element and operative in response to adjustment operation of said operating means to move said detector element in direction and amount proportional to said adjustment operation to return said nul zone of said detector element to the said position of reference of the web thereto upon termination of movement of the web in direction away from such position;
   said detector means including cam means connected for movement by movement of said feeler, and said detector element comprising a support for a pair of controls for supplying power for opposite regulatory operations respectively of said operating means, said cam means being oppositely movable relative to said support, by movements of said feeler, between spaced positions of alternate operating engagement of said cam means with said controls and an intermediate nul position, said support being movable by said feedback means relative to said cam means.

2. Apparatus according to claim 1 wherein said cam means comprises a cam shaft rotatable in response to movements of said feeler and said support is a housing for said cam shaft rotatable about the axis thereof.

References Cited

UNITED STATES PATENTS

| | | | |
|---|---|---|---|
| 3,040,944 | 6/1962 | Anderson | 226—21 |
| 3,119,535 | 1/1964 | Hoffman | 226—23 |
| 3,240,410 | 3/1966 | Jacobsen | 226—22 X |

ALLEN N. KNOWLES, Primary Examiner